(12) United States Patent
Clarke et al.

(10) Patent No.: US 6,817,018 B1
(45) Date of Patent: *Nov. 9, 2004

(54) METHOD OF TRANSFERRING MESSAGES BETWEEN COMPUTER PROGRAMS ACROSS A NETWORK

(75) Inventors: Paul Clarke, Southampton (GB); Peter Johnson, Winchester (GB); William Kingston, Eastleigh (GB); Robin Miles Drew, Cary, NC (US); George Black, Winchester (GB); Roger Meli, Winchester (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 907 days.

(21) Appl. No.: 08/861,181

(22) Filed: May 21, 1997

Related U.S. Application Data

(63) Continuation of application No. 08/448,423, filed as application No. PCT/GB93/02086 on Oct. 8, 1993, now abandoned.

(51) Int. Cl.[7] ................................................ G06F 9/46
(52) U.S. Cl. ...................................... 719/313; 718/101
(58) Field of Search ........................... 395/671, 182.14, 395/200.62; 709/101

(56) References Cited

U.S. PATENT DOCUMENTS

| | | | | |
|---|---|---|---|---|
| 4,663,706 A | * | 5/1987 | Allen et al. | ................... 364/200 |
| 4,736,369 A | * | 4/1988 | Barzilai et al. | ................ 370/94 |
| 4,972,437 A | * | 11/1990 | Citron et al. | .................. 375/37 |

(List continued on next page.)

FOREIGN PATENT DOCUMENTS

EP        457112 A2 *  11/1991

OTHER PUBLICATIONS

D. Mukhopadhyay, "Managing Interoperability Using APPC", IEEE, pp. 54–62, Apr. 1993.*

(List continued on next page.)

*Primary Examiner*—Sue Lao
(74) *Attorney, Agent, or Firm*—Jeanine S. Ray-Yarletts; Jerry W. Herndon

(57) ABSTRACT

A method of delivering messages between application programs is provided which ensures that no messages are lost and none are delivered more than once. The method uses asynchronous message queuing. One or more queue manager programs (100) is located at each computer of a network for controlling the transmission of messages to and from that computer. Messages to be transmitted to a different queue manager are put onto special transmission queues (120). Transmission to an adjacent queue manager comprises a sending process (130) on the local queue manager (100) getting messages from a transmission queue and sending them as a batch of messages within a syncpoint-manager-controlled unit of work. A receiving process (150) on the receiving queue manager receives the messages and puts them within a second syncpoint-manager-controlled unit of work to queues (180) that are under the control of the receiving queue manager. Commitment of the batch is coordinated by the sender transmitting a request for commitment and for confirmation of commitment with the last message of the batch, commit at the sender then being triggered by the confirmation that is sent by the receiver in response to the request.

The invention avoids the additional message flow that is a feature of two-phase commit procedures, avoiding the need for resource managers to synchronise with each other. It further reduces the commit flows by permitting batching of a number of messages.

9 Claims, 4 Drawing Sheets

U.S. PATENT DOCUMENTS

| | | | | |
|---|---|---|---|---|
| 5,036,518 A | * | 7/1991 | Tseung | 371/32 |
| 5,051,892 A | * | 9/1991 | Ferree et al. | 364/200 |
| 5,261,089 A | * | 11/1993 | Coleman et al. | 395/600 |
| 5,276,861 A | * | 1/1994 | Howarth | 395/575 |
| 5,363,505 A | * | 11/1994 | Maslak et al. | 395/650 |
| 5,371,886 A | * | 12/1994 | Britton et al. | 395/600 |
| 5,396,613 A | * | 3/1995 | Hollaar | 395/575 |
| 5,488,703 A | * | 1/1996 | Ferree et al. | 395/200.12 |
| 5,517,622 A | * | 5/1996 | Ivanoff et al. | 395/200.13 |
| 5,561,797 A | * | 10/1996 | Gilles et al. | 395/600 |
| 5,727,154 A | * | 3/1998 | Fry et al. | 395/200.19 |
| 5,903,724 A | * | 5/1999 | Takamoto et al. | 395/200.3 |

OTHER PUBLICATIONS

D. Jefferson, "Virtual Time", ACM Trans. Programming Languange and Systems, vol. 7, No. 3, pp. 404–425, Jul. 1985.*

J. Eppinger, et al, "Encina: Modular Transaction Processing", IEEE, pp. 378–382, 1992.*

* cited by examiner

METHOD OF TRANSFERRING MESSAGES BETWEEN COMPUTER PROGRAMS ACROSS A NETWORK

The application is a continuation, of application Ser. No. 08/448,423 filed Jun. 5, 1995, now abandoned which is a 371 of PCT/GB93/02086 filed Oct. 8, 1993.

FIELD OF THE INVENTION

The present invention relates to the safe delivery of messages between application programs in a transaction-oriented data processing network, such that no messages are lost and none are delivered more than once.

BACKGROUND TO THE INVENTION

It is known for updates to computer system resources (such as databases or file resources) to be made as a coordinated set of changes to two or more resources, such that either all of the changes take effect or none of them does. In this way, resources are prevented from being made inconsistent from each other. If one of the set of update operations fails then the others must also not take effect. A sequence of associated operations which transforms a consistent state of a recoverable resource into another consistent state (without necessarily preserving consistency at all intermediate points) is known as a "unit of work". Transaction processing is the execution of discrete units of work that access and update shared data. Logical points of consistency at which resource changes are synchronised within transaction execution (e.g. at termination) are called commit points or syncpoints (see below). An application ends a unit of work by declaring a syncpoint, or by the application terminating. The characteristic of a transaction being accomplished as a whole or not at all is known as "atomicity".

Atomicity of a transaction is known to be achieved by resource updates made within the transaction being held in-doubt (uncommitted) until a syncpoint is declared at completion of the transaction. That is, the resource updates are only made permanent and visible to applications other than the one which performed the updates on successful completion. If the transaction fails to complete successfully, then all changes that have been made to resources during the partial execution are removed—the transaction is said to rollback (or synonymously to backout), the resources being restored to the consistent state which existed before the transaction began. Any party (e.g. an application or resource manager) with an interest in the unit of work can cause a rollback when a syncpoint is declared by indicating unreadiness to commit.

A common problem in the provision of failure-tolerant data transmission is how to determine what stage has been reached in the transfer of messages that were in-doubt (i.e. had not been committed) when a failure occurred, to ensure that no messages are lost and none are sent more than once. Not all transaction systems remember the state of in-doubt messages.

The commit procedure is known as a "single-phase" procedure if only a single resource manager (the system software which controls resources) is responsible for coordinating the commitment of changes made by the transaction. Single phase commit processing is efficient in normal forward processing, consisting simply of issuance of a COMMIT operation instruction by an application or resource manager and then execution of the operation by the recipients of the instruction. There may be more than one resource manager involved, but the coordinator only calls each one once at syncpoint time to instruct them either to commit or rollback. In the vast majority of cases, all resource updates will be committed without error or interruption. However, if a problem arises (e.g. system or communication link failure) such that not all resource managers are unable to commit, then the resources can end up in an inconsistent state with some commits having been completed while others have not. The inconsistent resources then require resynchronisation. The cost of rebuilding non-critical resources following such a problem may be tolerable in view of the efficiency of the single-phase commit procedure.

In contrast, a two-phase commit procedure is often required to protect critical resources from such inconsistencies. For example, a financial application to carry out a funds transfer from one account to another account has two basic operations to perform to critical resources: the debit of one account and the credit of the other. It is important to ensure that either both or neither of these operations take effect. A two-phase commit procedure under the control of a syncpoint manager consists of the following steps:

1. During a prepare phase, each participant resource is polled by the syncpoint manager to determine whether the resource is ready to confirm and finalise all changes. Each resource promises to commit the resource update if all resources indicate readiness (i.e if they successfully complete the prepare phase);
2. During a commit phase, the syncpoint manager instructs all resources to finalise the updates or to back them out if any resource could not complete the prepare phase successfully.

The advantage of the additional prepare phase is in reducing the likelihood of inconsistencies, but there remains a period during processing at which even two-phase commit leaves the possibility of inconsistencies between resources if an error occurs. Also, there is a cost which accompanies the two-phase commit's reduction in the probability of inconsistencies: since all updated resources must be locked to prevent further update access for the duration of the unit of work, additional steps in the commit processing may represent a considerable reduction in concurrency of resource update processing (particularly if many resources are involved). If the resources are distributed around a network, two phase commit requires a distributed unit of work, which introduces the likelihood of locks being held for long periods, and also requires much more complicated recovery procedures. Three-phase and other multi-phase commit procedures may be implemented to further reduce the window of time in which a failure can cause inconsistencies, but each additional step of preparation for commit represents a cost in loss of concurrency.

The IBM System Network Architecture SNA LU6.2 syncpoint architecture (reference SC31-6808 Chapter 5.3 "Presentation Services—Sync Point Verbs", published by International Business Machines Corporation) has been known to coordinate commits between two or more protected resources. This architecture addressed syncpoint facilities consisting of a syncpoint manager which performed both syncpoint and associated recovery processing running in a single application environment. Several applications could run simultaneously in this environment. The LU6.2 architecture supports a syncpoint manager (SPM) which is responsible for resource coordination, syncpoint logging and recovery.

According to the SNA LU6.2 architecture, in phase one and in phase two, commit procedures are executed and the syncpoint manager logs the phase in the syncpoint log. Also, the syncpoint manager logs an identification of a logical unit of work which is currently being processed. Such logging assists the syncpoint manager in resource recovery or resynchronisation in the event that a problem arises during the two-phase commit procedure (e.g. a problem such as failure of a communication path or failure in a resource manager). If such a problem arises subsequent to entering the two-phase commit procedure, the log is read and resource recovery processing takes place to bring the resources involved in the commit to a consistent state. This two phase commit procedure requires locks to be held across different computers using distributed units of work.

SUMMARY OF THE INVENTION

In a first aspect, the present invention provides a method of inter-program communication in a transaction-oriented data processing network wherein a sender program is responsible for sending messages from a first node of the network and a receiver program is responsible for receiving messages at a second node of the network, messages to be transmitted between the two nodes being sent from the sender program within a first syncpoint-manager-controlled unit of work and being received by the receiver program within a second syncpoint-manager-controlled unit of work such that the sending and receiving operations are held in-doubt (uncommitted) until resolution of the first and second units of work, respectively, characterised in that the first and second units of work are logically linked so that commit processing at resolution of the units of work comprises either:

in response to successful receipt of the messages by the receiver program, committing said second unit of work, transmitting to the sender program a positive confirmation of receipt, and in response to the positive confirmation committing the first unit of work; or in response to unsuccessful receipt of the messages, rolling back the second unit of work, transmitting to the sender program a negative confirmation of receipt, and in response to said negative confirmation backing out the first unit of work.

The present invention reduces the problem of the known single-phase commit procedures of failures during commit processing causing inconsistencies between resources that then require resynchronisation, and also avoids the undesirable increased locking of resources that is a feature of the extra prepare stage in the known two-phase commit procedures.

Preferably, if the confirmation from the receiving program is lost, due to a system or communication link failure, then the first unit of work remains in doubt. Log records which were written for each get and put operation performed by the sending and receiving programs are then examined to determine which operations have been committed at the receiving end thereby to determine which operations should be committed and which should be backed out at the sending end.

The present invention may be implemented in a network of computers wherein application programs communicate using messaging and queuing and wherein a message queue manager program is located at each computer in the network, the transmission between the aforesaid sender and receiver programs being transmission between respective queue manager programs. The nodes of the network are either message queue managers or computer systems on which one or more queue managers are located. Message transmission between queue managers involves a first queue manager getting an application-program-originated message from a queue and sending the message, and a second queue manager receiving the message and putting it onto a second queue (either for processing by a local application program, or for transmission to another queue manager if neither the first nor the second queue manager was the destination queue manager). Messaging and queuing is described in the document "IBM Messaging and Queuing Series—technical reference" (SC33-0850-01, 1993), and below in relation to an embodiment of the present invention.

It is preferred that each message-sending or message-receiving unit of work may include a plurality of messages, and that each confirmation of receipt (or receipt and storage, if received messages are put to queues) may relate to such a plurality of messages. This method of transmitting messages in a batch as a unit of work provides a great improvement in processing efficiency, since the transport connection direction (forwards for message transmission and backwards for confirmation of receipt) is only turned around at the end of each batch. This is distinguished from the prior art method of sending messages to queues as individual units of work and committing after each send operation, which risks leaving resources at the sending end in an inconsistent state with resources at the receiving end, and requires a change of direction of message flow after each send and after each confirmation if two phase commit is used. This batch transmission of messages between sending and receiving programs, as a stage of the transfer of messages between application programs, is also clearly distinguished from batch processing by an application program, which is well known in the art.

The messages which may be transmitted as a batch in this way may be logically unrelated and may be destined for different application programs (which may be served by different queue managers)—the only common factor between the messages which is necessary for them to be transmitted as a batch between a first and a second queue manager is that the second queue manager is the next queue manager from the first queue manager on the way to each message's destination queue manager. Prior art methods of message transmission do not enable batch transmission (where batch size is greater then one) of messages which are destined for different application programs, and so cannot benefit from the processing efficiency provided by the present invention. For many database systems, commit processing is the expensive stage of the processing in terms of computing facilities—in particular, disk access is expensive as compared with RAM processing—so improvements to commit processing efficiency are highly desirable.

Preferably, the batch has a request to commit the batch and to confirm receipt transmitted with it to the receiving program, so that commit processing is being coordinated by the sending end of the communication. A message may be transmitted as a plurality of segments if it is too large for the transport connection to transfer in one go. Where there is segmentation, the request for confirmation will be associated with the last segment in the batch. On successful receipt of the batch of messages at the receiving end the confirm request is acted on by committing the receipt and communicating a confirmation of the successful receipt.

In a second aspect, the present invention provides a method of inter-program communication in a transaction-oriented data processing network wherein a message to be delivered is sent to a queue from a sending application program at a first computer and is then asynchronously taken from the queue to be processed by a receiving application program, characterised in that:

each step of sending a message to a queue or taking a message from a queue is carried out under the control of a message queue manager program, at least one of which is located at each computer in the network;

messages to be delivered to a local application program are put on a local queue serviced by the local application program; whereas messages to be delivered to remote application programs on remote computers are put on local transmission queues for transmission, respectively for each transmission queue, to the next message queue manager program on the way to the respective destination remote message queue manager programs, wherein all messages put on a particular transmission queue, which messages may be destined for different destination message queue manager programs, are transmissable to said next message queue manager as a batch of messages within a syncpoint-manager-controlled unit of work.

DESCRIPTION OF AN EMBODIMENT

The present invention will now be described in more detail with reference to the accompanying drawings in which.

Message queuing is a message of inter-program communication which allows programs to send and receive application-specific data without having a direct connection established between them. Before describing the detail of a specific implementation of the present invention in a messaging and queuing network, it will be helpful to describe the general methodology of inter-program communication using messaging and queuing.

Figure 1:
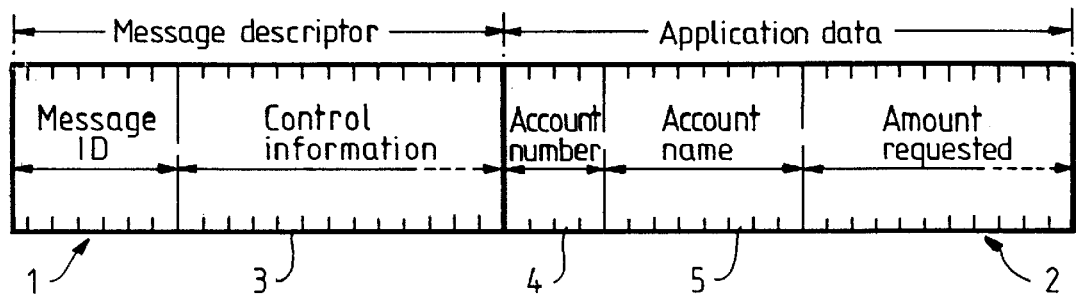
FIG. 1 is a representation of the data fields making up a message.

A message consists of two parts, application data 1 and a message descriptor 2 containing control information 3, as shown in FIG. 1. The application data in a message is defined and supplied by the application which sends the message. There are no constraints on the nature of the data in the message (for example, it could consist of one or more of bit strings, character strings, binary integers, packed decimal integers, floating point numbers). Applications view the string of bits and bytes that make up a message as consisting of a sequence of items which each have a particular data type and meaning. For example, if the message relates to a financial transaction, the first item 4 may be a four-byte unsigned binary integer containing an account number and the second item 5 may be a twenty-byte character string containing a customer,name. This data is called the application data.

In addition to the application data, a message has associated with it some ancillary data. This is information that specifies the properties of the message, and is used by the message queuing service to decide how the message should be processed. Some of this information must be specified by the application. This ancillary control information is contained in a data structure called the message descriptor 2.

A message queue is a named object in which messages accumulate and from which they are later removed. Each queue belongs to one particular queue manager, which is responsible for the maintenance of that queue. A queue manager can own many queues, but each queue must have a name that is unique within the queue manager instance that owns the queue. A message queue is not merely a stack: when messages are added to a queue, they are added at the end, and when messages are taken from a queue, they are normally removed from the front (although facilities do exist for reading messages in other than a FIFO order—for example it may be desirable for messages which require a reply to be retrieved as a high priority).

The physical representation of a message queue depends on the environment, but can be a buffer or buffers in main storage, a file or files on disk or other permanent storage device, or both of these. However, the physical management of message queues is entirely the responsibility of a queue manager (the system service that provides the message-queuing facilities used by applications), and such details are not made apparent to the application program. Applications can view a message queue simply as a "black box" in which messages accumulate. Applications have no access to message queues other than through the message queuing calls (such as MQGET for taking messages from a queue and MQPUT for sending messages to a queue). Applications obtain message queuing services by using the message-queuing calls to communicate with the queue manager that is installed on the same system as the application (i.e the local queue manager).

For message queuing services to be available, there must be at least one queue manager on a system. More than one queue manager may be required, for example, in order to keep development work separate from production work. Each different queue manager instance is known by its name, which must generally be unique with in the network of interconnected queue managers so that one queue manager can unambiguously identify the target queue manager to which any given message should be sent.

Applications communicate by agreeing to use particular named message queues, sending messages to the specific target queues that the application programs have agreed to read from. The location of these queues need not be apparent to the applications which send the messages; each application interacts only with its local queue manager, and it is the network of interconnected queue managers that is responsible for moving the messages to the intended queues. Since cross-network communication sessions are established between queue managers rather than between individual programs, programs are less vulnerable to network failures than in certain other types of inter-program communication. If a link between processors fails, it is the job of the queue managers to recover from the failure. Programs on the effected processors are not brought to a halt by such an event, and indeed need not be aware that it has happened.

Figure 2:
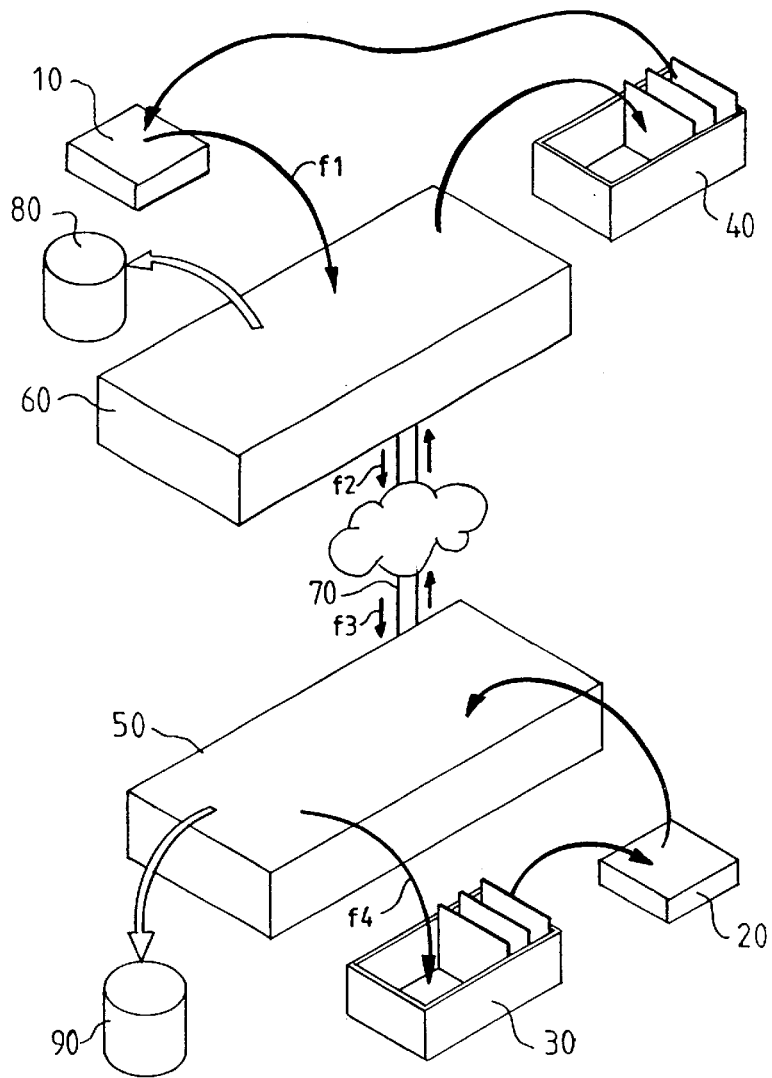
FIG. 2 is a schematic representation of two programs communicating with each other using messaging and queuing.

FIG. 2 is a representation of the flow of messages between two communicating programs in a message queuing network in the simple example of one-to-one communication. The two programs 10,20 send messages to each other via queues 30,40 under the control of respective queue managers 50,60. The first program 10 puts messages onto the second program's queue 30 without a dedicated logical connection having to be established between the programs (this message flow is represented in FIG. 2 by arrows f1, f2, f3 and f4). The queue managers 50,60 ensure that the messages are moved across the network, such that the programs themselves are shielded from network variations and complexities. This is represented in FIG. 2 by network link 70. All of the work involved in maintaining message queues, in handling network failures and restarts, and in moving messages around the network, can be handled by the queue managers. Program 20 subsequently takes the messages from the queue 30 to process them, when it is ready rather than when the sending program 10 chooses. Any changes made to recoverable resources by the transfer of messages and subsequent processing are recorded in recovery logs 80,90 for use in the event of a subsequent failure.

Figure 3:
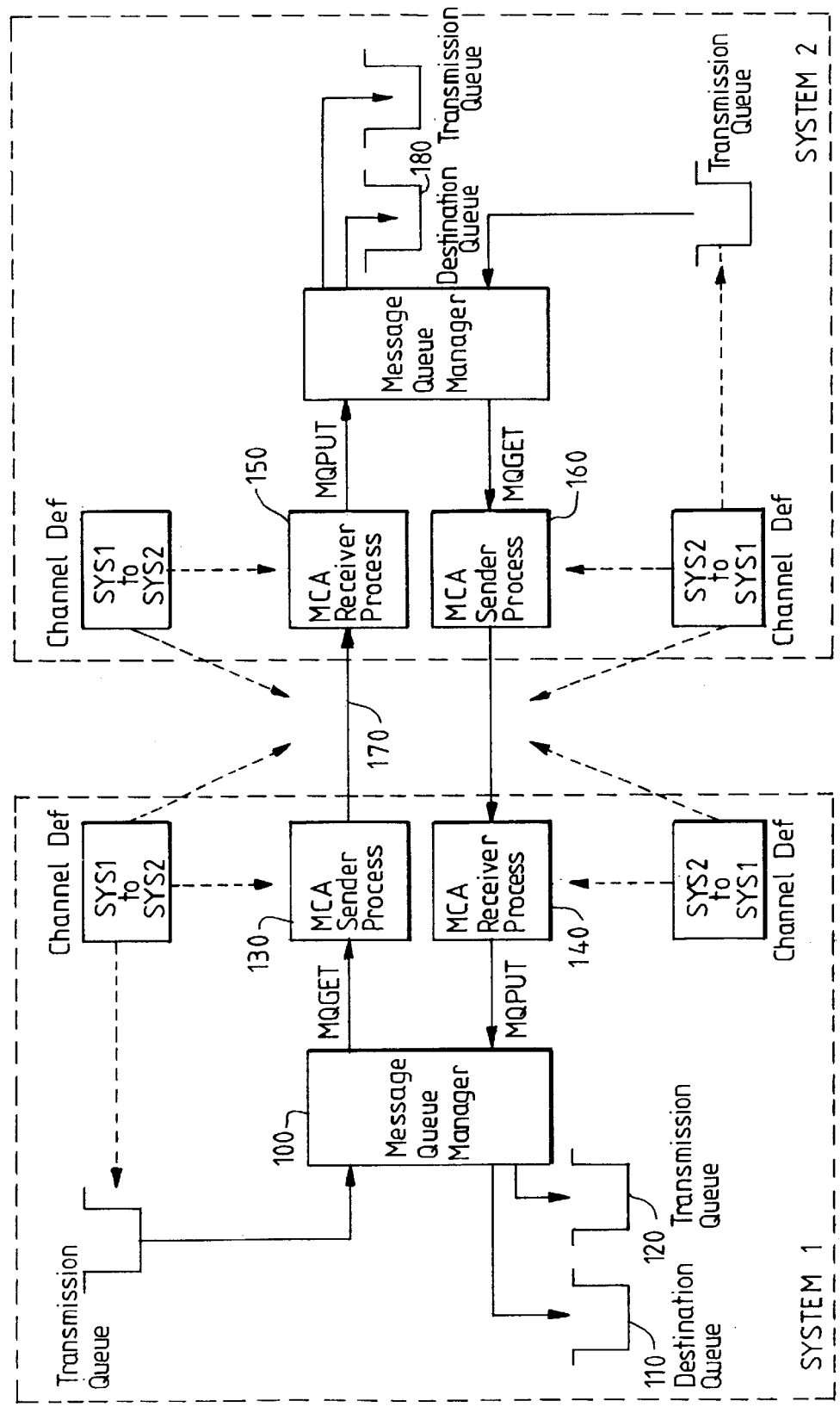
FIG. 3 is a representation of two adjacent computer systems and the interrelationships between the system entities involved in message communication according to an embodiment of the present invention.

As represented in FIG. 3, queue managers 100 may store messages onto a number of different queues. If the messages are eventually to be processed by local application programs then the queue manager stores them on local destination queues 110; and if the messages are eventually to be processed by a remote application, then the queue manager stores them in special local queues known as transmission queues 120. Transmission queues containing messages to be sent to queues belonging to remote queue managers enable the movement of messages to remote queues to be carried out in stages between adjacent queue managers. This staging of message transmission, which will be described in detail below, is invisible to the application programs involved in the communication. There may be a plurality of local destination queues and of transmission queues controlled by a particular queue manager, as will be explained below.

The messages on a transmission queue are extended by the queue manager to include a transmission queue header in addition to the application message (the data being transferred by an application). The transmission queue header is an architected descriptor containing the name of the destination queue and the message descriptor. Messages on destination queues include the application data and a message header specifying control information.

The transport relationship between two queue managers is known as a channel. The key elements defining a channel are the name of a transmission queue, information concerning the transport processes or programs 130,150 which send or receive messages over the channel (these processes, which are part of the queue managers, are known as message channel agents—hereafter MCAs), and communications protocol and target system information for the destination to which messages on the transmission queue are to be sent. The association between a particular channel definition and the various data model entities involved in the message communication is represented by broken lines in FIG. 3. Each named channel is defined in both the sending and receiving nodes. The channel name is used in the transmissions between the sender and receiver processes to identify the channel to the receiver or for a receiver to request that messages from a particular channel be sent. Channel definition has some information which is common for all environments and some which depends on the operating system environment and underlying communications protocol to be used.

The communication of messages between queue managers is carried out by MCAs working in pairs across specific channels: one sender 130 and one receiver 150. A pair of MCA processes uses a transport connection 170 such as a VTAM APPC session or a TCP/IP connection as a transport layer. Message traffic in the opposite direction flows between a sender 160 and a receiver 140 on a different channel, the channels being used effectively as unidirectional pipes between nodes. There are four types of MCAs:

Sender—which takes messages from a transmission queue and sends them to a Receiver or Requester;

Receiver—which receives messages and queues them;

Requester—which sends a single message to cause a Sender or Server to be started remotely;

Server—which is started by a message from a requester, and then becomes a Sender.

An MCA 130 dequeues messages from transmission queues and transmits them over the transport connection 170. The receiving MCA 150 queues the messages to the destination queues 180 named in the message header. These two units of work, dequeue and enqueue, are performed such that any failure at any point in the protocol can be detected and rectified so that each message is delivered once and once only. In the case where the destination queue is more than one hop from the original transmission queue, the receiving MCA will queue the message on another transmission queue for the next hop. This provides a safe store and, in the event that the next connection is unavailable, the necessary asynchronism to allow this first stage of transmission to still be carried out. The message format and the safe movement protocol are transport layer independent so that MCAs can support different transport protocols on different channels. The protocols used by the MCAs are described below.

A channel may be started in a number of different ways:

1. a terminal operator may issue a START CHANNEL command;
2. the channel can be triggered, a Sender MCA being started automatically by a queue manager when a message arrives on the transmission queue; or
3. by a network request—the communications transport being configured to automatically start an MCA when a request from the network is received. Receiver, Server and Sender channels could be configured this way.

Before any messages or data can flow down a channel, the two MCAs which are to use it must first negotiate the way in which they are going to communicate. Thus, channel initialisation involves negotiation of certain protocol parameters, such as which communication partner is going to do any needed conversion of control and message header data. Two MCAs may be running on systems using two different data formats. For example, one may be using ASCII and the other EBCDIC. One may be encoding numbers left to right, the other right to left. The control information and message header data must be converted from the sender's representation to the receiver's. Data conversion over channels applies only to control information (such as destination queue name, control field lengths, and the like): no application data conversion is performed by MCAs, since MCAs do not need to interact with the application data in a message when they transmit it.

Figure 4:
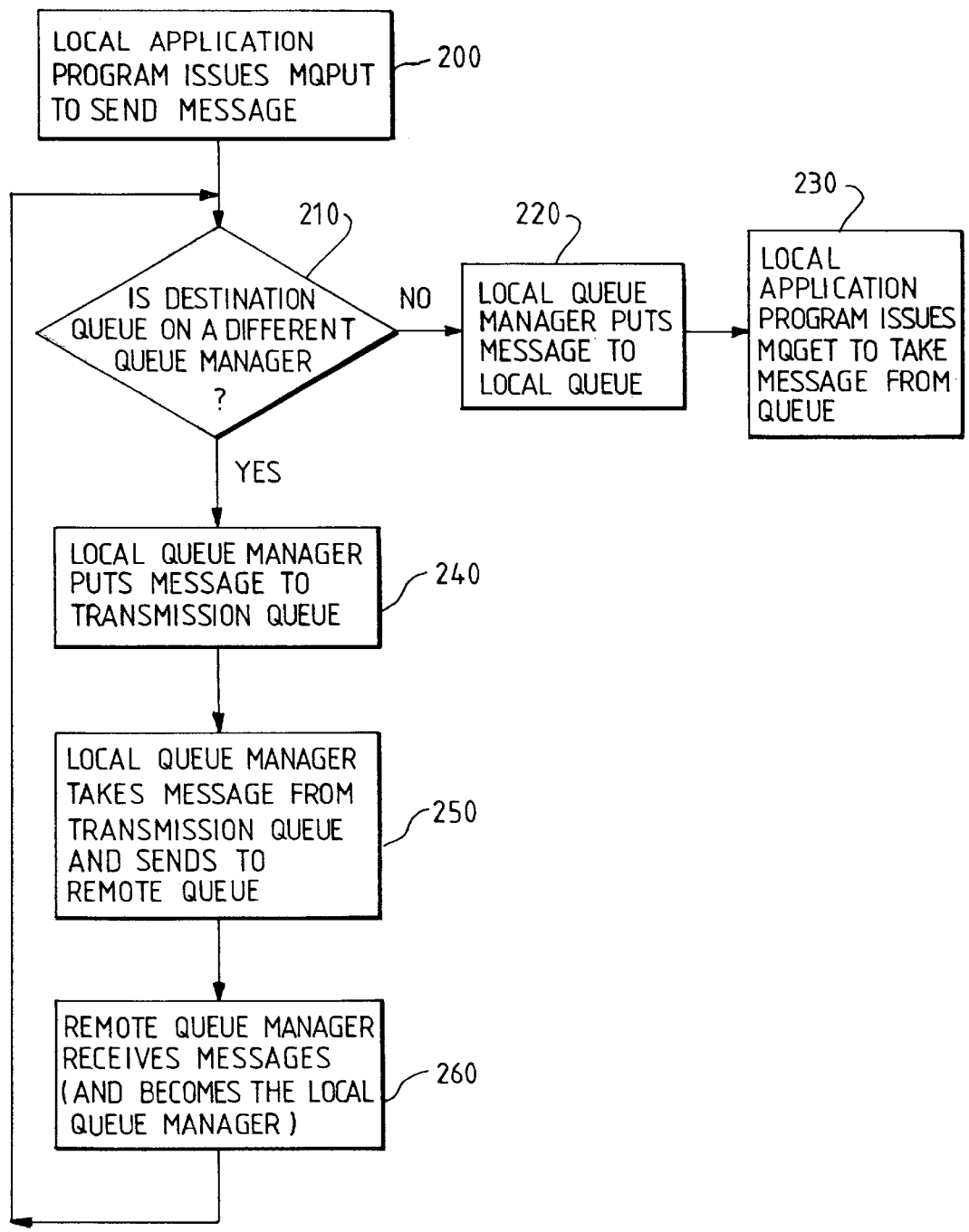
FIG. 4 is an overview flow diagram of a method of message communication between application programs according to an embodiment of the present invention.
Figure 5:
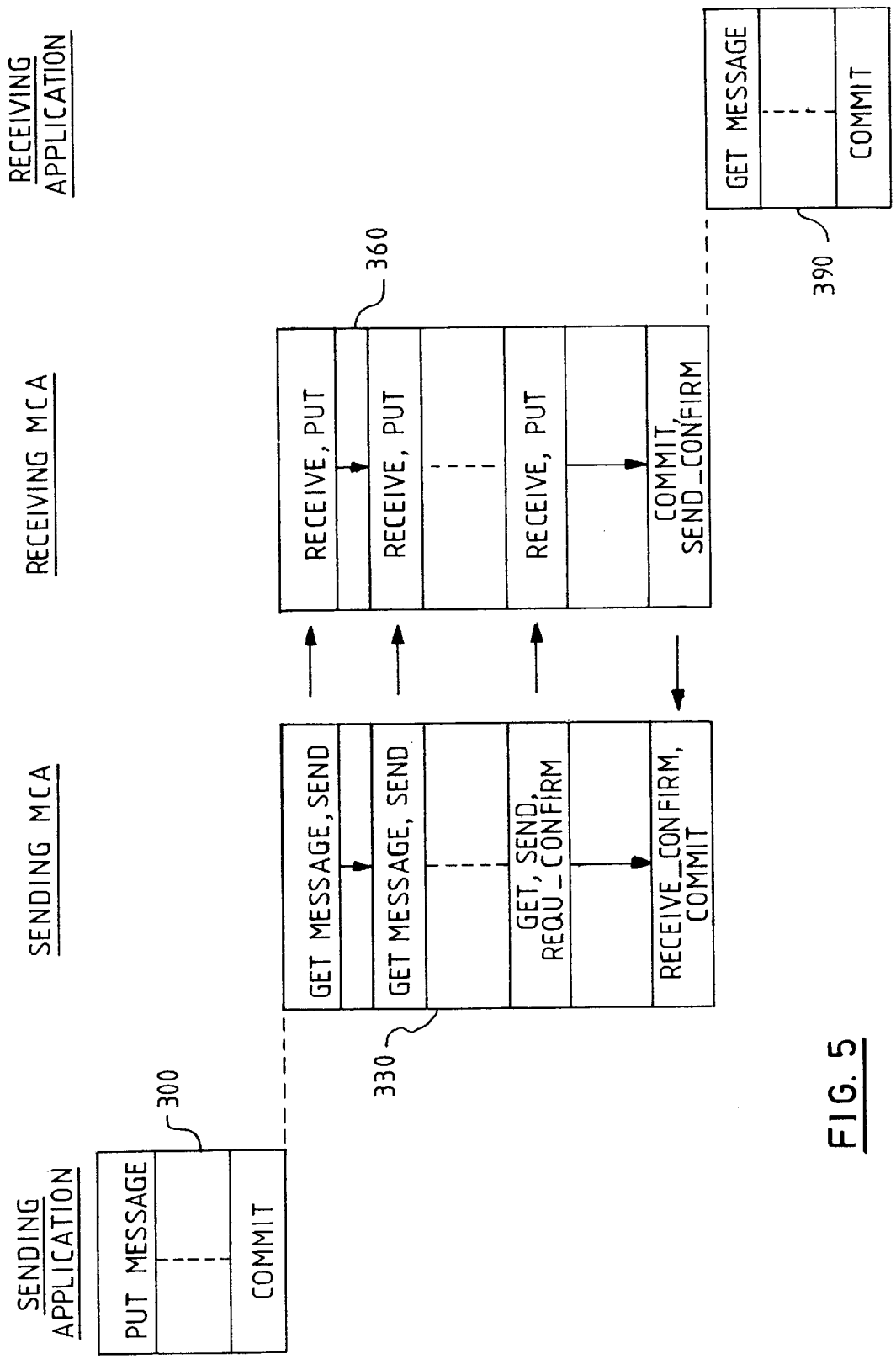
FIG. 5 is a representation of the message flows between processes during normal forward processing in a method of communication between application programs, according to an embodiment of the present invention.

The method of delivering messages between applications on different computer systems involves the following steps, described with reference to FIGS. 4 and 5:

An application sends a message to a target destination queue for processing by another application by issuing (200) an MQPUT command. The local queue manager reads the destination queue name specified by the application in the message's header and determines (210) where to put the message. If the destination queue is a local queue then the local queue manager puts (220) the message into that local queue. The unit of work including the operation of putting the message to a queue must be committed before the message is available to other applications. An application serving that local queue can then asynchronously issue MQGET (230) to take the message from the queue for processing. The MQPUT and MQGET operations are within two separate units of work.

If the destination queue is not the responsibility of the local queue manager, then the local queue manager puts the message onto a local transmission queue (240), for transfer to another queue manager. There may be a plurality of transmission queues defined for each queue manager, but a one-to-one correspondence between transmission queues and remote destination queues is not necessary. All messages that are to be passed between two adjacent queue managers (that is, all messages to be sent from a first queue manager which have a common nearest neighbour queue manager in the direction of their respective target destination queue managers) can be put in the same transmission queue. It is equally possible to have a number of transmission queues for traffic going to the same next node. A maximum batch size is specified (for example 50 messages) to limit the number of messages which will have to be resent in the event of a failure. The unit of work 300 which puts the message to the transmission queue must be committed before the message is available to other processes.

The local queue manager (or an end user) starts a sender MCA to transmit messages to the next queue manager. The sender MCA then gets messages (250) (issues MQGET) from a transmission queue owned by this queue manager and transmits them as a batch to the next queue manager on the way to the destination queue manager or queue managers. Each message is either transmitted in one transmission or as a plurality of transmission segments in a plurality of transmissions if the messages are too large for the transport connection to send in one go (e.g. a message might be 4 Megabytes in size and the maximum transfer size 32 kilobytes). The steps of getting and transmitting messages is performed within a syncpoint-manager-controlled unit of work 330, which is held in-doubt by the sender at this stage. Log records are written specifying the in-doubt state of the resource updates. The batch has a request for confirmation of receipt of the batch attached to it: this is implemented by the last message (or the last transmission segment of the last message) of the batch having a Request_Confirm control flag set in its transmission segment header.

Each message has a message sequence number associated with it—one of a monotonically increasing sequence of numbers, uniquely assigned to a single application message on a channel. Message sequence numbers are used to resynchronise between sender and receiver in the event of a link failure or program failure. The highest message sequence number in the batch is taken as the logical unit of work identifier (LUWID)—a unique value defining a batch of messages on a channel which are under control of a syncpoint manager.

The receiver MCA receives (260) the messages and the receiver queue manager determines (210) where each message is to be sent (as the sending queue manager program did previously). The receiver queue manager puts the messages (using MQPUT) within a syncpoint-manager-controlled unit of work 360 to queues belonging to the receiving computer system's queue manager, which may be the actual application-specified destination queue for a particular message or may be a related transmission queue for the next hop towards the target system.

Either all of the messages in the batch of messages transferred by MCAs are successfully received and queued by the receiving queue manager or the batch is rejected as a whole and not safe stored at the receiver (the unit of work is rolled back). If the batch is successfully received and queued then the receiver sends an acknowledgement of receipt and storage (a Status segment indicating "No error" is transmitted), having logged the LUWID and committed the batch of messages together as an atomic action. On receipt of the positive acknowledgement the sender also commits the batch of messages using the LUWID, this commit of the MQGET operation deleting the messages from the transmission queue. The next batch can then be started. If no messages are left on the transmission queue (and a preset time interval has expired) or a request to close the channel has been received, then the connection can be terminated.

If the batch is rejected, an acknowledgement of rejection (a Status segment indicating Error—which may include details of the error) is transmitted to the sender which then rolls back its in-doubt messages onto the transmission queue ready for retry, and terminates the channel. If a batch of messages is rolled back, the sequence number or LUWID must also be rolled back, to the value of the last successfully committed batch. If no confirmation is received, due to transport or communication-partner failure, then the channel is terminated by the sender and the receiver MCA's unit of work is rolled back. If the sender has not yet sent a confirm request then the sender MCA should also roll back. If it has sent a confirm request then its log records and those of the receiver program must be examined to determine whether it should be committed or rolled back. The MCAs automatically perform the determination of whether the first unit of work should be committed or rolled back (unless contact cannot be reestablished in which case the operator may take the decision). Following a rollback, the sending MCA may try to re-establish a channel and resynchronise with the sending MCA in order to resend the failed batch.

Channel resynchronisation is achieved during channel initialisation. The sender MCA retrieves from its log the in-doubt LUWID, or message sequence number of the last message sent for which a confirmation was also sent. The receiving MCA will check his logged LUWIDs or sequence numbers to determine whether he is in sync with the sender. As a result of the comparison, he will confirm or reject the resynchronisation request by returning an appropriate Status segment, containing the LUWID or sequence number of the last successfully committed message or batch of messages at his end. If this value matches the sender's, the sender may commit the previously sent messages, and commence sending the next one. If the receiver's value matches the previous LUWID or sequence number, the sender rolls back and resends the previous message or batch.

The MCAs thus use a syncpoint manager to control each batch as a logical unit of work. The unit of work including the MQGET of the sender message queue manager and the unit of work including the MQPUT of the receiver message queue manager are logically linked in that both are held in doubt until the receiver is ready to commit, messages being committed at the receiving end before deleting them at the sending end using a single-phase commit protocol. Two phase commit is not required as the sender acts as a commit coordinator. Any system failure that occurs before the end of the batch, either at the sender or receiver, may require the unit of work to be backed out during a resynchronisation phase.

This single-phase commit using logical linkage of units of work on different systems avoids the problem of a two phase commit needing to synchronise (lock) all participating resources in a distributed unit of work. In the present invention, resource managers do not actually have to synchronise with each other. A limited period of inconsistency between resources as viewed by applications is accepted, but final consistency is assured since atomic transaction processing is assured.

To complete the assured delivery of messages, the target application which services the destination queue can issue MQGET to get messages from the queue as part of a unit of work 390 under the control of its local syncpoint manager, to allow rollback of the message to the queue in case of application failure or commit of a successfully processed message to delete it.

What is claimed is:

1. A method of transactional control of message transfer across a transaction-oriented data processing network wherein a sender program is responsible for sending messages from a first node of the network and a receiver program is responsible for receiving messages at a second node of the network, the method comprising:

sending messages by the sender program within a first syncpoint-manager-controlled unit of work and receiving messages by the receiver program within a second syncpoint-manager-controlled unit of work, while holding the sending and receiving operations in-doubt, uncommitted, until resolution of the first and second units of work, respectively, wherein the first syncpoint-manager-controlled unit of work and the second syncpoint-manager-controlled unit of work are logically linked so that commit processing at resolution of said units of work comprises the steps of:

in response to successful receipt of the messages by the receiver program, performing the sequence of steps of committing said second unit of work, transmitting to the sender program a positive confirmation of receipt, and in response to the positive confirmation committing the first unit of work; or in response to unsuccessful receipt of the messages, performing the sequence of steps of rolling back the second unit of work, transmitting to the sender program a negative confirmation of receipt, and in response to said negative confirmation backing out the first unit of work.

2. A method according to claim 1 wherein said sender and receiver programs are located on adjacent nodes within a network, and wherein messages, which may be destined for different destination nodes, are transmitted between adjacent nodes on the way to their respective destination nodes as a batch of messages within a unit of work, the units of work incorporating said sending and receiving operations being held in-doubt until the end of the batch.

3. A method according to claim 2 wherein the last message in a batch is transmitted together with a request for commitment of and for confirmation of receipt of the batch, the commitment of said second unit of work and the transmission of said positive or negative confirmation being in response to said request.

4. A method according to claim 1 wherein log records are written to record the in-doubt status of said units of work for use in recovery processing following a failure during the processing of said units of work, the log records being read during recovery processing to determine which units of work should be committed and which should be backed out.

5. A method according to claim 1, which implements messaging and queuing for communication between application programs, the application programs sending messages to message queues from where receiver application programs can asynchronously take the messages for processing or forwarding on.

6. A method according to claim 5, wherein communication between application programs running on different computer systems of the network comprises at least the following steps:

a first application program issuing a put message instruction under control of a synchpoint manager in the sending computer system, for sending a message to a message queue;

sender and receiver transmission programs transferring messages between the computer systems, as two logically linked units of work, using synchpoint managers in both the sending and receiving computer systems; and a second application program issuing a get message instruction under control of a synchpoint manager in the receiving computer system, for taking the message from the queue;

wherein the operations of put message, transfer and get message are each held in-doubt until resolution of the respective unit of work.

7. A data processing system including a messaging manager for transactional control of message transfer across a network of data processing systems, the messaging manager including sender and receiver programs for transferring messages between adjacent messaging managers in the network in accordance with the following transfer protocol:

a sender program of a first messaging manager sending one or more messages within a first syncpoint-manager-controlled unit of work;

a receiver program in a second messaging manager receiving said messages within a second syncpoint-manager-controlled unit of work;

the sending and receiving operations being held in-doubt, uncommitted, until resolution of the first syncpoint-manager-controlled unit of work and the second syncpoint-manager-controlled unit of work, respectively; and said first and second units of work being logically linked so that commit processing at resolution of said first and second units of work comprises either (i) in response to successful receipt of the messages by the receiver program, committing said second unit of work, transmitting to the sender program a positive confirmation of receipt, and in response to the positive confirmation committing the first unit of work; or (ii) in response to unsuccessful receipt of the messages, rolling back the second unit of work, transmitting to the sender program a negative confirmation of receipt, and in response to said negative confirmation backing out the first unit of work.

8. A data processing system according to claim 7, wherein the messaging manager is adapted for message queuing inter-program communication across a heterogeneous network of data processing systems, the messaging manager including an application programming interface by which applications attach to the messaging manager and providing queuing services enabling application programs to put messages onto message queues for asynchronous retrieval by other application programs.

9. A computer program product comprising computer program code recorded on a computer-readable recording medium, the computer program code implementing a messaging manager for transactional control of message transfer across a network of data processing systems, the messaging manager including sender and receiver programs for transferring messages between adjacent messaging managers in the network in accordance with the following transfer protocol:

a sender program of a first messaging manager sending one or more messages within a first syncpoint-manager-controlled unit of work;

a receiver program in a second messaging manager receiving said messages within a second syncpoint-manager-controlled unit of work;

the sending and receiving operations being held in-doubt, uncommitted, until resolution of the first syncpoint-manager-controlled unit of work and the second syncpoint-manager-controlled unit of work, respectively; and said first and second units of work being logically linked so that commit processing at resolution of said first and second units of work comprises either
 (i) in response to successful receipt of the messages by the receiver program, committing said second unit of work, transmitting to the sender program a positive confirmation of receipt, and in response to the positive confirmation committing the first unit of work; or
 (ii) in response to unsuccessful receipt of the messages, rolling back the second unit of work, transmitting to the sender program a negative confirmation of receipt, and in response to said negative confirmation backing out the first unit of work.

* * * * *